Feb. 13, 1968     R. A. HARRIS     3,368,768
APPARATUS FOR ROTATING A TAKE-UP REEL
Filed March 7, 1966     2 Sheets-Sheet 1
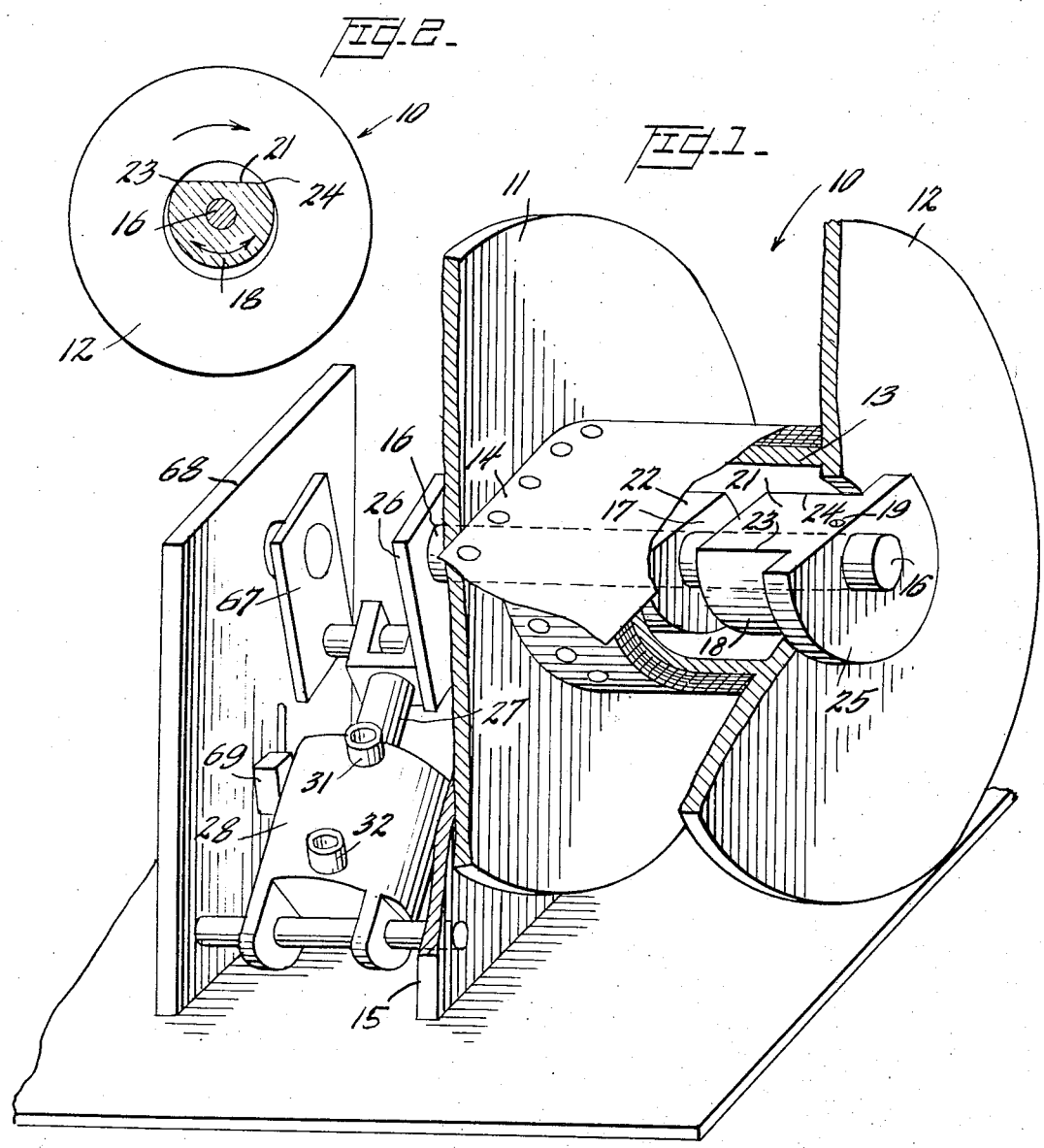
INVENTOR.
R. A. Harris,
BY
S. Gundersen
ATTORNEY

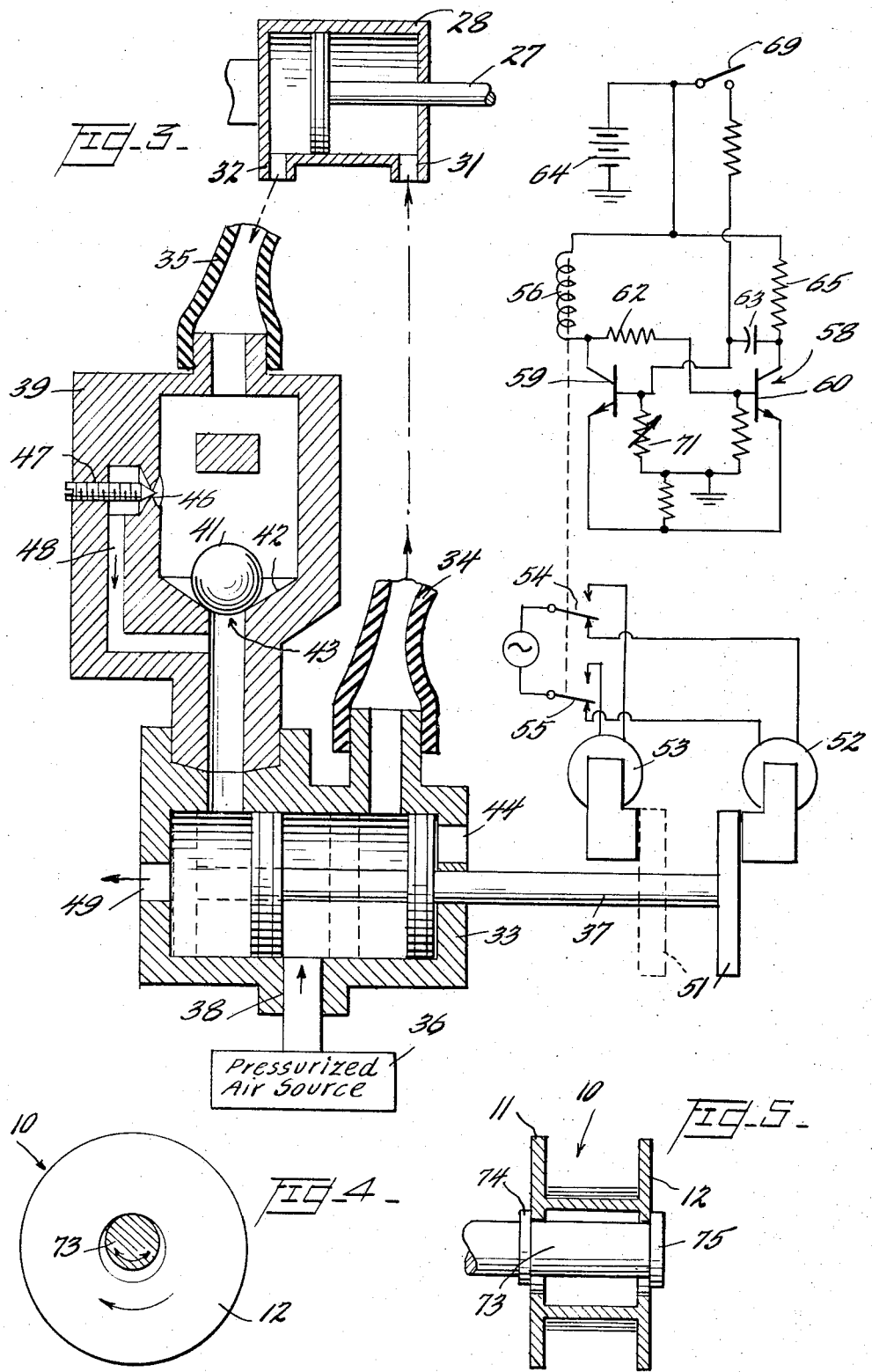

United States Patent Office 3,368,768
Patented Feb. 13, 1968

3,368,768
APPARATUS FOR ROTATING A TAKE-UP REEL
Richard A. Harris, High Point, N.C., assignor to Western Electric Company, Incorporated, New York, N.Y., a corporation of New York
Filed Mar. 7, 1966, Ser. No. 532,157
8 Claims. (Cl. 242—55)

This invention relates to an apparatus for rotating a take-up reel.

In the manufacture of flexible printed circuits, a metal coated plastic strip material is fed from a supply, passed through processing stations, and then is wound up on a take-up reel. It is desirable to wind the strip tightly on the take-up reel without breaking the strip.

Accordingly, an object of the present invention is a new and improved apparatus for automatically rotating a reel to take up a strip.

Another object of the invention is an apparatus for applying an intermittent rotative force to a reel to tightly wind a strip on the reel.

A further object of the invention is an apparatus for rotating a reel in which the force applied to rotate the reel does not break the strip.

With these and other objects in view, the present invention contemplates a rotatable arbor frictionally supporting a reel wherein the arbor is oscillated slowly in a forward direction to rotate the reel and rapidly in a reverse direction to slip the arbor with respect to the reel.

In a preferred embodiment, the arbor has a flat surface and the reel is supported upon the edges of the flat surface. The friction between the edges and the reel causes rotation of the reel when the arbor rotates slowly in a forward direction. The arbor slips with respect to the reel when the arbor rotates rapidly in a reverse direction.

A complete understanding of this invention may be had by reference to the following detailed description when considered in conjunction with the accompanying drawings, wherein:

FIG. 1 is a partial perspective view of an apparatus for rotating a take-up reel in accordance with the principles of the present invention;

FIG. 2 is a side view of the reel and the arbor shown in FIG. 1 particularly showing how the reel is supported by the arbor;

FIG. 3 is an electrical and fluid control circuit for the apparatus shown in FIG. 1;

FIG. 4 is a side view similar to FIG. 2 showing a cross section of an alternate cylindrical arbor construction; and FIG. 5 is a front view of the alternate arbor shown in FIG. 4.

Referring first to FIGS. 1 and 2, there is shown a reel 10 having annular flanges 11 and 12 connected by a hollow cylinder drum 13 upon which a strip 14 is wound. An arbor comprising a shaft 16 and two collars 17 and 18 is rotatably mounted on a bracket 15. The collar 18 is removably fastened to the shaft 16 by a set screw 19 and the collar 17 is removably fastened to the shaft 16 by a similar set screw (not shown).

The arbor extends through the central opening of the reel 10 and frictionally supports the reel 10 along its axis of rotation. The collar 19 has a flat surface 21 parallel to its axis of rotation and the collar 17 has a similar flat surface 22. The flat surface 21 has edges 23 and 24 upon which the inner surface of the hole in the annular reel flange 12 is frictionally supported. The flat surface 22 has similar edges upon which the inner surface of the hole in the annular flange 11 is frictionally supported.

A flange 25 on the collar 18 and a similar flange (not shown) on the collar 17 limits axial movement of the reel 10 with respect to the collars 17 and 18. The set screw 19 may be loosened and the collar 18 removed from the shaft to allow removal of the reel 10 from the arbor.

The shaft 16 is oscillated by a crank arm 26 having a first end attached to the shaft 16 and a second end pivotally connected to a piston rod 27 extending from an air cylinder 28. Air forced into a first inlet 31 of the air cylinder retracts the piston rod 27 into the air cylinder 28 (see FIG. 3) and air forced into a second inlet 32 advances the piston rod 27 from the air cylinder 28.

Air is supplied to the air cylinder 28 by a shuttle valve 33 (FIG. 3) connecting a pressurized air source 36 alternately to hoses 34 and 35 connected to the respective inlets 31 and 32. An actuator 37 in the shuttle valve 33 in a first position connects an inlet 38 of the valve 33 to the hose 34 for connecting the air supply 36 to the inlet 31. When the actuator 37 is in a second position (as shown by the dashed lines), the inlet 38 is connected to the hose 35 for connecting the air supply to the inlet 32. When air is forced into one of the inlets of the air cylinder 28, the piston in the air cylinder 28 moves to force air out of the other inlet of the air cylinder 28.

A one-way restriction valve 39 is connected in series with the hose 35 to restrict or impede the flow of air from the inlet 32. The restriction valve 39 has a ball 41 normally resting in a seat 42 for stopping air flow through an opening 43 in the seat 42 when air flows from the inlet 32. A passageway 48 in the restriction valve 39 has a small opening 46 into which a control needle 47 extends. The needle 47 is adjustable to produce a desired reel advance speed by restricting the flow of air from the hose 35 through the passageway 48 and out an exhaust opening 49 of the shuttle valve 33. The restricted air flow from inlet 32 allows only slow retraction of the piston rod 27 into the air cylinder 28. Thus, when the actuator 37 is in its first position, the piston rod 27 rotates the shaft 16 slowly in a forward or clockwise direction (as seen in FIGS. 1 and 2) and the force of friction between edges of the surfaces 21 and 22 and the inner surfaces of the holes in the annular reel flanges 11 and 12 is greater than the inertia of the reel. The force of friction rotates the reel 10 to take up any slack in the strip 14. When the slack in the strip 14 is taken up, the inner surfaces of the holes in the reel flanges 11 and 12 slip on the collars 17 and 18, thus preventing breakage of the strip 14.

When the actuator 37 is in its second position (as shown in dashed lines), air flows from the inlet 38 and the ball 41 is raised from its seat 42 to allow air to flow freely from the opening 43 through the restriction valve 39 and the hose 35 to the inlet 32. Also, air flows freely from inlet 31 through hose 34 and out of an exhaust outlet 44 of the shuttle valve 33. Since there is no restriction in the flow of air, either into inlet 32 or out of inlet 31, the piston rod 27 advances rapidly to rotate the shaft 16 in a reverse or counterclockwise direction of rotation (as seen in FIGS. 1 and 2). Due to the inertia of the reel 10 being much greater than the force of friction applied to the reel, the rapid rotation of the shaft 16 in the reverse direction slips the collars 17 and 18 with respect to the annular flanges 11 and 12, thus leaving the reel 10 in its advanced position.

Alternate action of the shuttle valve 33 is accomplished by a magnetic member 51 attached to the actuator 37 which is attracted by magnetic flux produced by either a solenoid 52 or a solenoid 53 to move the actuator 37 into its respective first and second positions. The solenoid 52 is excited when contacts 54 and 55 of a relay 56 are in a first position and the solenoid 53 is excited when the contacts 54 and 55 are in a second position.

Relay operation is controlled by a monostable multivibrator 58 which has first and second transistors 59 and 60 with the collector of the first transistor 59 connected by a resistor 62 to the base of the second transistor 60. The collector of the second transistor is connected by a capacitor 63 to the base of the first transistor 59. A voltage source 64 is connected by the relay winding 56 to the collector of the first transistor and by a resistor 65 to the collector of the second transistor 60.

Normally, the transistor 59 is biased non-conductive and the transistor 60 is biased conductive; and thus, the relay 56 is not excited and the contacts 54 and 55 are in their first position. With the contacts 54 and 55 in their first position, the actuator 37 is in its first position and the piston rod 27 is slowly retracted into the air cylinder 28. The retracting piston rod 27 rotates the collars 17 and 18 in the forward direction to rotate the reel 10 to take up any slack in the strip 14. When the piston rod 27 becomes fully retracted, an arm 67 (see FIG. 1.) which is pivotally connected at a first end to the piston rod 27 and at its second end to a bracket 68, strikes an arm of a normally open switch 69 mounted on the bracket 68 to close the switch 69. Closing the switch 69 applies a voltage to the base of the transistor 59 to change the transistor 59 from its nonconductive state to a conductive state and to change the transistor 60 from its conductive state to a nonconductive state. Current through the now conductive transistor 59 excites the relay 56 to move the contacts 54 and 55 to their second position to excite the solenoid 53 to move the actuator 37 to its second position. Thus, air flow through the shuttle valve 33 advances the piston rod 27 rapidly to slip the collars 17 and 18 within the reel 10.

After a period of time determined by the time constant of the capacitor 63 and a variable resistor 71 which connects the base of the transistor 59 to ground, the bias applied to the base of the transistor 59 stops the conduction through the transistor 59; thus, the monostable multivibrator 58 reverts to its initial condition. The variable resistor 71 may be adjusted to control the rate of discharge from the capacitor 63 to insure sufficient time to advance the piston rod 27 from the cylinder 28 to a desired position. When the monostable multivibrator 58 returns to its initial condition, the relay 65 is deactuated and the solenoid 52 is again energized to move the actuator 37 back to its first position. Thus, another cycle of oscillation of the shaft and the collars 17 and 18 is initiated.

An alternate cylindrical arbor 73 for frictionally supporting the reel 10 is shown in FIGS. 4 and 5. The inner surfaces of the holes in the annular reel flanges 11 and 12 are frictionally supported by the upper cylindrical surface of the arbor 73. The arbor 73 has two annular flanges 74 and 75 formed thereon for limiting axial movement of the reel 10 with respect to the arbor 73. The outside diameter of the annular flange 75 is small enough to allow the reel 10 to be axially removed from the arbor 73. The diameters of the flanges 74 and 75 are sufficiently larger than the diameter of the arbor 73 to limit axial movement of the reel 10 with respect to the arbor 73.

When the arbor 73 is rotated slowly in a forward or clockwise direction (as shown in FIG. 4), the force of friction between the arbor 73 and the inner surfaces of the holes in the annular reel flanges 11 and 12 is greater than the inertia of the reel; thus, the reel 10 rotates to take up slack in the strip 14. When the slack in the strip 14 is taken up, the inner surfaces of the holes in the reel flanges 11 and 12 slip on the arbor 73 thus preventing breakage of the strip 14.

When the arbor 73 rotates rapidly in a reverse or counterclockwise direction of rotation (as shown in FIG. 4), the arbor 73 slips with respect to the reel 10, thus leaving the reel 10 in its advanced position. The angular acceleration of the arbor 73 in the reverse direction is such that the inertia of the reel 10 is much greater than the force of friction between the arbor 73 and the inner surfaces of the holes in the annular reel flanges 11 and 12.

The strip 14 is very tightly wound on the drum 13 by the intermittent force applied to the reel 10 by successive oscillations of the shaft 16 and the collars 17 and 18. Breakage of the strip 14 is prevented by the slipping of the reel 10 with respect to the collars 17 and 18 when the slack in the strip is taken up.

It is to be understood that the above-described embodiment of the invention is simply illustrative of the principles of the invention and that many modifications may be made within the scope of the invention.

What is claimed is:

1. In an apparatus for rotating a take-up reel,
   a rotatable arbor frictionally supporting the reel along its axis of rotation, and
   means for oscillating the arbor (a) slowly in a forward direction of rotation to rotate the reel and (b) rapidly in a reverse direction of rotation to slip the arbor with respect to the reel.

2. In an apparatus for rotating a take-up reel as defined in claim 1 wherein the rotatable arbor has a flat surface and the reel is frictionally supported upon at least one edge of the flat surface whereby the friction between the edge and the reel causes rotation of the reel when the arbor rotates slowly in a forward direction and the arbor slips with respect to the reel when the arbor rotates rapidly in a reverse direction.

3. In an apparatus for rotating a take-up reel as defined in claim 1 wherein the rotatable arbor is cylindrical.

4. In an apparatus for rotating a take-up reel as defined in claim 1, wherein the rotatable arbor comprises:
   a rotatable shaft connected to the oscillating means; and
   a removable collar on the shaft having (a) a flat surface parallel to its axis of rotation for frictionally supporting the reel upon at least one edge of the flat surface and (b) a flange for holding the reel to prevent axial movement of the reel while the collar is on the shaft, whereby the friction between the edge and the reel rotates the reel when the arbor rotates slowly in a forward direction and the arbor slips with respect to the reel when the arbor rotates rapidly in a reverse direction.

5. In an apparatus for rotating a take-up reel as defined in claim 1 wherein the oscillating means comprises:
   an arm having first and second ends with the first end fastened to the arbor for rotation therewith;
   a fluid cylinder having a piston rod pivotally connected to the second end of the arm and having first and second inlets wherein fluid forced into the first inlet moves the piston rod in a first direction to rotate the arbor in a forward direction, and fluid forced into the second inlet moves the piston rod in a second direction to rotate the arbor in a reverse direction;
   a source of pressurized fluid;
   a shuttle valve means having a first position for connecting the source to the first inlet, and a second position for connecting the source to the second inlet; and
   means for restricting the fluid flow only when the shuttle valve is in the first position to move the piston rod slowly in the first direction to rotate the reel, whereby the piston rod moves rapidly in the second direction when the shuttle valve is in the second position to slip the arbor with respect to the reel.

6. In an apparatus for rotating a take-up reel as defined in claim 2, wherein the oscillating means comprises:
   an arm having first and second ends with the first end fastened to the arbor for rotation therewith;
   a fluid cylinder having a piston rod pivotally connected to the second end of the arm and having first and second inlets wherein fluid forced into the first inlet moves the piston rod in a first direction to rotate the arbor in a forward direction, and fluid forced into the second inlet moves the piston rod in a second direction to rotate the arbor in a reverse direction;

a source of pressurized fluid;

a shuttle valve means having a first position for connecting the source to the first inlet, and a second position for connecting the source to the second inlet; and means for restricting the fluid flow only when the shuttle valve is in the first position to move the piston rod slowly in the first direction to rotate the reel, whereby the piston rod moves rapidly in the second direction when the shuttle valve is in the second position to slip the arbor with respect to the reel.

7. An apparatus for rotating a take-up reel as defined in claim 4, wherein the oscillating means comprises:

an arm having first and second ends with the first end fastened to the shaft for rotation therewith;

a fluid cylinder having a piston rod pivotally connected to the second end of the arm and having first and second inlets wherein fluid forced into the first inlet moves the piston rod in a first direction to rotate the arbor in a forward direction and fluid forced into the second inlet moves the piston rod in a second direction to rotate the arbor in a reverse direction;

a source of pressurized fluid;

a shuttle valve means having a first position for connecting the source to the first inlet, and a second position for connecting the source to the second inlet; and means for restricting the fluid flow only when the shuttle valve is in the first position to move the piston rod slowly in the first direction to rotate the reel, whereby the piston rod moves rapidly in the second direction when the shuttle valve is in the second position to slip the arbor with respect to the reel.

8. An apparatus for rotating a take-up reel as defined in claim 5 wherein, the restricting means is variable to allow adjustment of the speed of movement of the piston in the first direction, and which includes the additional element comprising:

variable timing means actuated in response to a predetermined angle of rotation of the arbor in the forward direction for moving the shuttle valve means from its first position to its second position for a predetermined duration.

References Cited

UNITED STATES PATENTS 2,665,130   1/1954   Vermeulen _____ 226—189 X

WILLIAM S. BURDEN, *Primary Examiner.*